United States Patent
Hunter et al.

(10) Patent No.: US 10,538,314 B2
(45) Date of Patent: Jan. 21, 2020

(54) ANTI-VIBRATION MOMENT GENERATING AIRCRAFT ACTUATION SYSTEM

(71) Applicant: Sikorsky Aircraft Corporation, Stratford, CT (US)

(72) Inventors: David H. Hunter, Cheshire, CT (US); William A. Welsh, North Haven, CT (US); Bryan Kenneth Baskin, Arlington, TX (US); Chris Paul Butler, Frisco, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 362 days.

(21) Appl. No.: 15/514,086

(22) PCT Filed: Sep. 23, 2015

(86) PCT No.: PCT/US2015/051576
§ 371 (c)(1),
(2) Date: Mar. 24, 2017

(87) PCT Pub. No.: WO2016/057215
PCT Pub. Date: Apr. 14, 2016

(65) Prior Publication Data
US 2017/0297686 A1    Oct. 19, 2017

Related U.S. Application Data

(60) Provisional application No. 62/056,015, filed on Sep. 26, 2014.

(51) Int. Cl.
*B64C 27/00* (2006.01)
*B64C 27/10* (2006.01)
*B64C 27/12* (2006.01)

(52) U.S. Cl.
CPC ............ *B64C 27/001* (2013.01); *B64C 27/10* (2013.01); *B64C 27/12* (2013.01); *B64C 2027/002* (2013.01); *B64C 2027/004* (2013.01)

(58) Field of Classification Search
CPC . B64C 27/001; B64C 27/10; B64C 2027/002; B64C 2027/004; B64C 11/008
See application file for complete search history.

(56) References Cited

U.S. PATENT DOCUMENTS 3,181,815 A    5/1965  Paul
4,212,588 A    7/1980  Fradenburgh
(Continued)

FOREIGN PATENT DOCUMENTS

GB         2160840 A       1/1986
WO    WO2008033884 A2     3/2008
(Continued)

OTHER PUBLICATIONS

ISR/WO, dated Mar. 11, 2016, PCT Application No. PCT/US15/51576, 15 pages.
(Continued)

*Primary Examiner* — Philip J Bonzell
*Assistant Examiner* — Tye William Abell
(74) *Attorney, Agent, or Firm* — Cantor Colburn LLP

(57) ABSTRACT

An aircraft is provided and includes an airframe, an engine, a drive portion driven by the engine, a rotor apparatus, which includes a rotor rotatable relative to the airframe and a fairing, a gearbox disposed to transmit rotational energy from the drive portion to the rotor to drive the rotor to rotate relative to the airframe and which generates a rotor rotation vibration, support members by which the gearbox is disposed on the airframe and an actuation system including actuation elements disposed at the fairing, the actuation system being configured to generate an anti-vibration
(Continued)

moment using the actuation elements disposed at the fairing to counter the rotor rotation vibration.

14 Claims, 4 Drawing Sheets

(56) References Cited

U.S. PATENT DOCUMENTS

| | | | |
|---|---|---|---|
| 4,470,121 A | 9/1984 | Ebert | |
| 5,190,244 A | 3/1993 | Yana | |
| 5,219,143 A * | 6/1993 | Staple | B64C 27/001 244/17.11 |
| 5,316,240 A * | 5/1994 | Girard | B64C 27/001 188/380 |
| 5,732,905 A * | 3/1998 | Krysinski | B64C 27/001 244/17.13 |
| 5,906,254 A | 5/1999 | Schmidt et al. | |
| 6,105,900 A | 8/2000 | Welsh et al. | |
| 6,145,785 A * | 11/2000 | Certain | B64C 27/001 244/17.27 |
| 6,229,898 B1 | 5/2001 | Goodman | |
| 6,416,016 B1 | 7/2002 | Welsh | |
| 6,467,723 B1 | 10/2002 | Rossetti et al. | |
| 7,118,328 B2 | 10/2006 | Welsh et al. | |
| 8,113,321 B2 | 2/2012 | McGuire et al. | |
| 8,235,351 B1 | 8/2012 | Lear | |
| 8,435,002 B2 | 5/2013 | Jolly et al. | |
| 8,538,590 B2 | 9/2013 | Sun et al. | |
| 2002/0128072 A1 * | 9/2002 | Terpay | B64C 27/001 464/1 |
| 2008/0142633 A1 * | 6/2008 | McGuire | B64C 27/001 244/17.27 |
| 2009/0269199 A1 * | 10/2009 | Rudley | B64C 27/72 416/113 |
| 2012/0156033 A1 | 6/2012 | Cowles | |
| 2012/0325966 A1 | 12/2012 | Christenson et al. | |
| 2013/0119187 A1 | 5/2013 | Germanetti | |
| 2014/0091172 A1 * | 4/2014 | Arlton | B64C 27/14 244/17.23 |

FOREIGN PATENT DOCUMENTS

| | | |
|---|---|---|
| WO | WO2010099521 A1 | 9/2010 |
| WO | WO2016022672 A1 | 2/2016 |

OTHER PUBLICATIONS

European Search Report for European Application No. 15849690.1; Report dated May 2, 2018 (pp. 1-9).

* cited by examiner

ANTI-VIBRATION MOMENT GENERATING AIRCRAFT ACTUATION SYSTEM

This application claims the benefit of PCT Application No. PCT/US15/51576, filed on Sep. 23, 2015, which in turn claims priority to U.S. provisional patent application Ser. No. 62/056,015, filed Sep. 26, 2014. The entire contents of PCT Application No. PCT/US15/51576 and U.S. provisional patent application Ser. No. 62/056,015 are incorporated herein by reference.

BACKGROUND OF THE INVENTION

The subject matter disclosed herein relates to an anti-vibration moment generating aircraft actuation system and, more particularly, to an aircraft actuation system including actuation elements configured to generate an anti-vibration moment to counter rotor rotation vibration.

An aircraft, such as a helicopter, typically includes an airframe with a top portion at which a main rotor apparatus is rotatably supported and a tail portion at which a tail rotor apparatus is rotatably supported. The aircraft may further include a drive portion that drives rotation of main and tail rotors for flight operations. This rotation generates vibratory loads that are transmitted to the airframe and can cause discomfort to pilots, crewmen and passengers as well as damage.

BRIEF DESCRIPTION OF THE INVENTION

According to one aspect of the invention, an aircraft is provided and includes an airframe, an engine, a drive portion driven by the engine, a rotor apparatus, which includes a rotor rotatable relative to the airframe and a fairing, a gearbox disposed to transmit rotational energy from the drive portion to the rotor to drive the rotor to rotate relative to the airframe and which generates a rotor rotation vibration, support members by which the gearbox is disposed on the airframe and an actuation system including actuation elements disposed at the fairing, the actuation system being configured to generate an anti-vibration moment using the actuation elements disposed at the fairing to counter the rotor rotation vibration.

In accordance with additional or alternative embodiments, the rotor includes an upper rotor, which is rotatable relative to the airframe in a first direction and a lower rotor, which is rotatable relative to the airframe in a second direction opposite the first direction.

In accordance with additional or alternative embodiments, the fairing is disposed between the upper and lower rotors and is hollow.

In accordance with additional or alternative embodiments, the actuation elements include first, second and third single-point actuators disposed within the fairing.

In accordance with additional or alternative embodiments, the first, second and third single-point actuators are transversely oriented with respect to one another to drive respective anti-vibration loads in substantially orthogonal directions.

In accordance with additional or alternative embodiments, the actuation system further includes an actuator disposed on at least one or both of the gearbox and one or more of the support members.

In accordance with additional or alternative embodiments, the actuation system includes an active vibration control system configured to control operations of the actuation elements.

In accordance with additional or alternative embodiments, the actuation elements are controlled via wiring.

In accordance with additional or alternative embodiments, the actuation elements are wirelessly controlled, and the actuation elements disposed at the fairing further include a power source which powers the actuation elements disposed at the fairing.

In accordance with additional or alternative embodiments, the anti-vibration moment is adjustable in magnitude, phase and frequency.

In accordance with yet another aspect of the invention, an actuation system of an aircraft is provided. The aircraft includes coaxial, counter rotating rotors rotatable relative to an airframe, a fairing disposed between the rotors, a gearbox disposed to transmit rotational energy to the rotors to drive rotor rotation and support members by which the gearbox is disposed on the airframe. The actuation system includes actuation elements disposed at the fairing and an active vibration control system configured to control the actuation elements at the fairing to generate an anti-vibration moment to counter rotor rotation vibration.

In accordance with additional or alternative embodiments, the actuation elements disposed at the fairing include first, second and third single-point actuators within the fairing.

In accordance with additional or alternative embodiments, the first, second and third single-point actuators are transversely oriented with respect to one another.

In accordance with additional or alternative embodiments, an actuator is disposed on at least one or both of the gearbox and one or more of the support members and the active vibration control system is further configured to control the actuation elements at the gearbox and the support members to generate an anti-vibration moment to counter rotor rotation vibration.

In accordance with additional or alternative embodiments, the actuation elements are wirelessly controlled.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

The detailed description explains embodiments of the invention, together with advantages and features, by way of example with reference to the drawings.

As will be described below, vibratory loads generated by rotation of the main rotor(s) in a co-axial rotor system of an aircraft are transmitted throughout the aircraft via a main transmission and cause vibration of the fuselage, engine(s) and passengers. Nullifying the main transmission motion will cause vibration throughout the aircraft to be dramatically reduced thus improving passenger comfort and aircraft reliability by reducing component fatigue. Such nullification can be achieved by disposing multiple actuators in the gearbox of the main transmission whereby the actuators generate counter forces and moments of suitable magnitude, phase and frequency to counter the vibratory loads. However, with main transmissions being continually reduced in size over time, gearbox dimensions are getting smaller over time as well. The miniaturization of gearbox dimensions leads to the actuators being placed closer and closer together, which makes generation of moments of suitable magnitude, phase and frequency difficult.

The description provided herein thus relates to the maximization of distances between anti-vibration actuators in a rotor system to thereby maximize potential anti-vibration moments that the system can produce. The distance maximization is achieved by placing some of the actuators in a fairing disposed between the two rotors of a co-axial rotor and some of the actuators on or near the gearbox. The large distance between these sets of actuators enables large anti-vibration moments to be generated.

Figure 1:
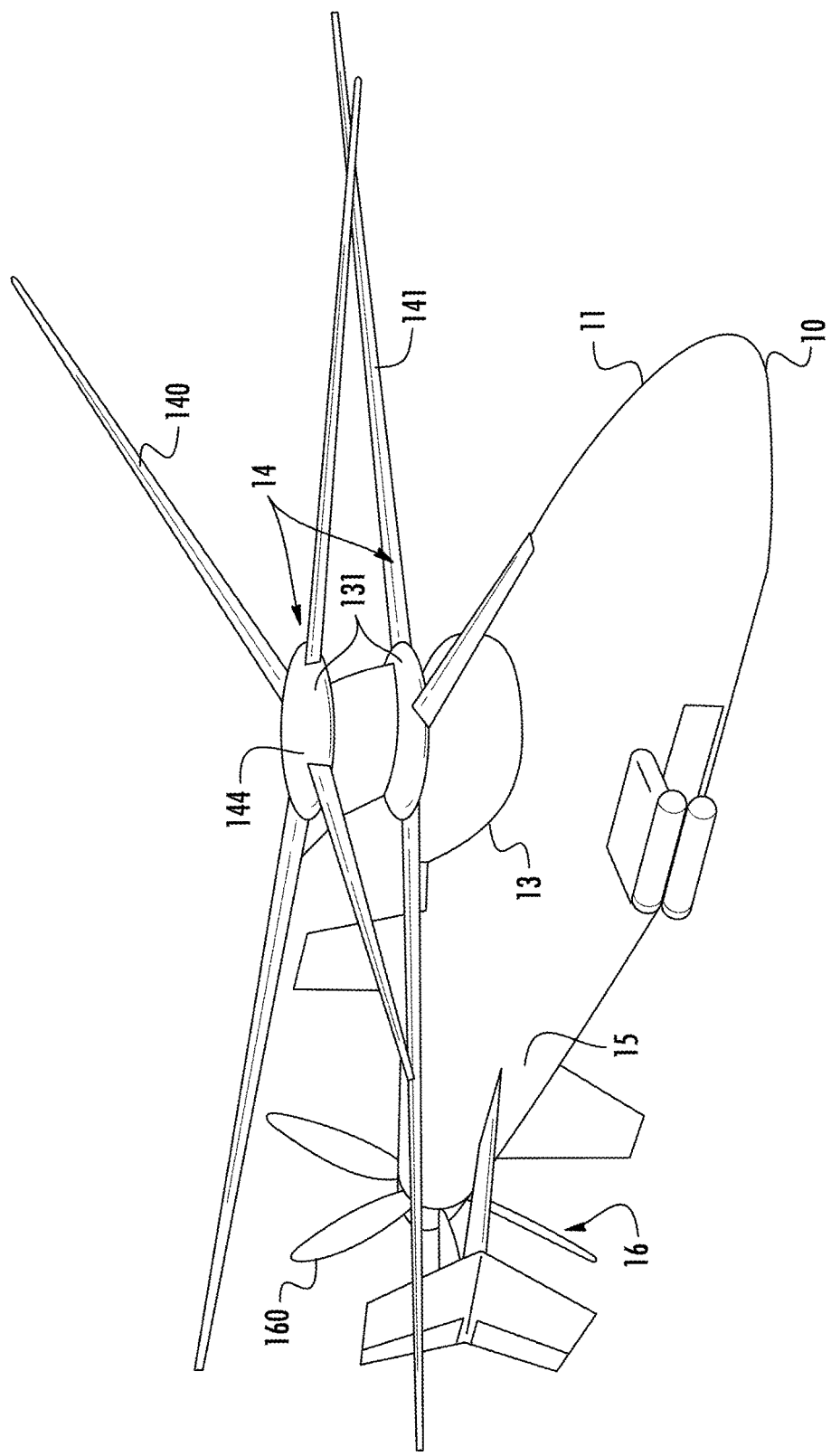
FIG. 1 is a perspective view of an aircraft in accordance with embodiments.
Figure 2:
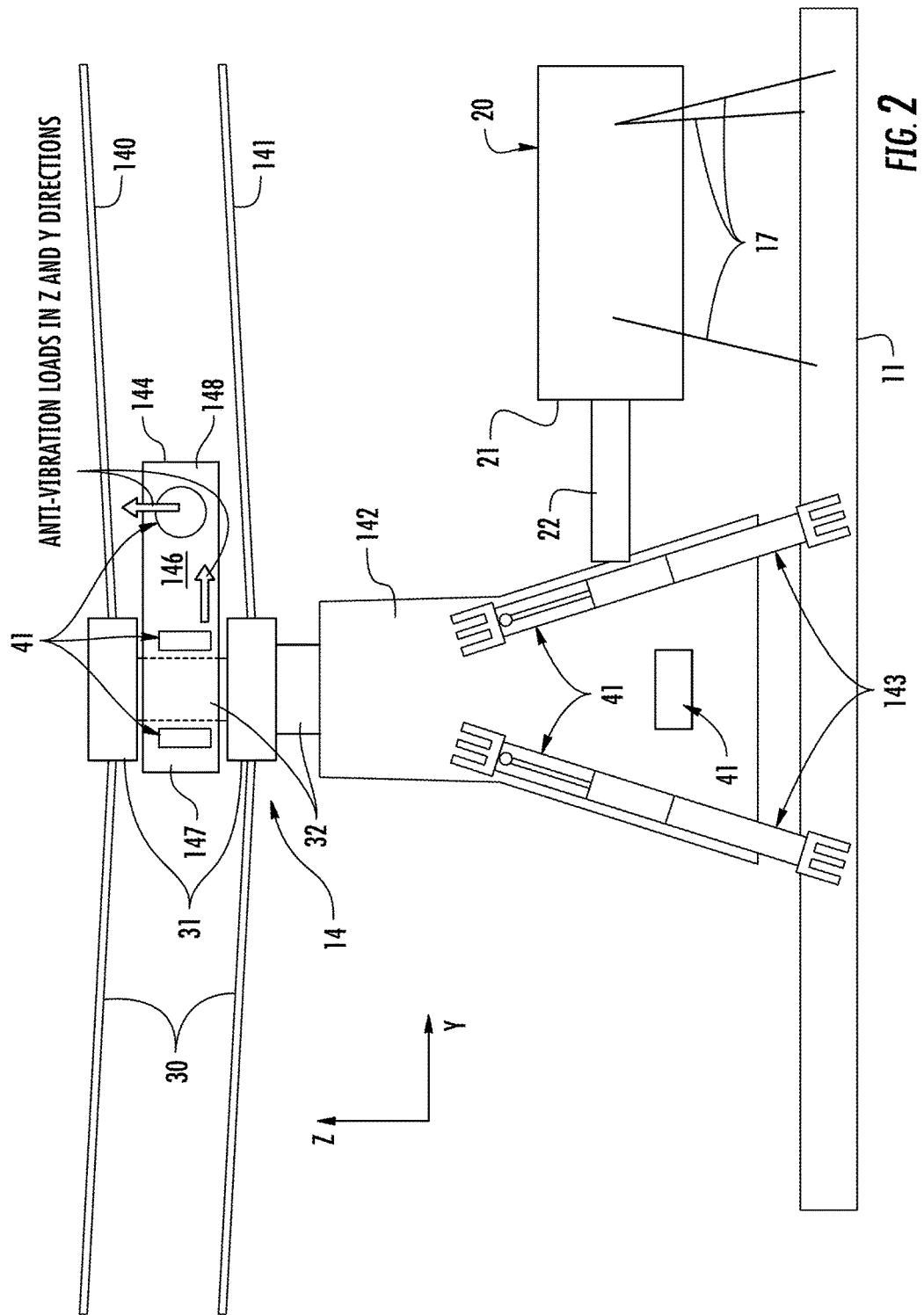
FIG. 2 is a side schematic view of an upper portion of the aircraft of FIG. 1 in accordance with embodiments.
Figure 3:
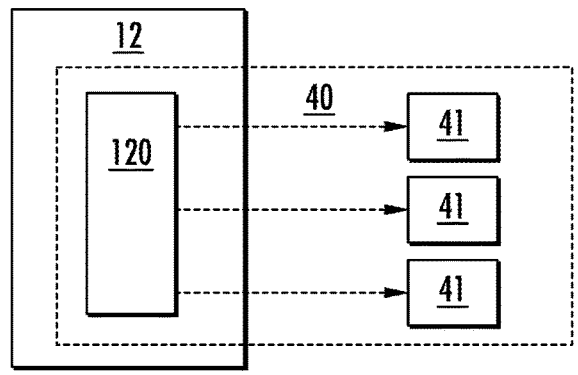
FIG. 3 is a schematic diagram of an actuation system of the aircraft of FIGS. 1 and 2 in accordance with embodiments.
Figure 4:
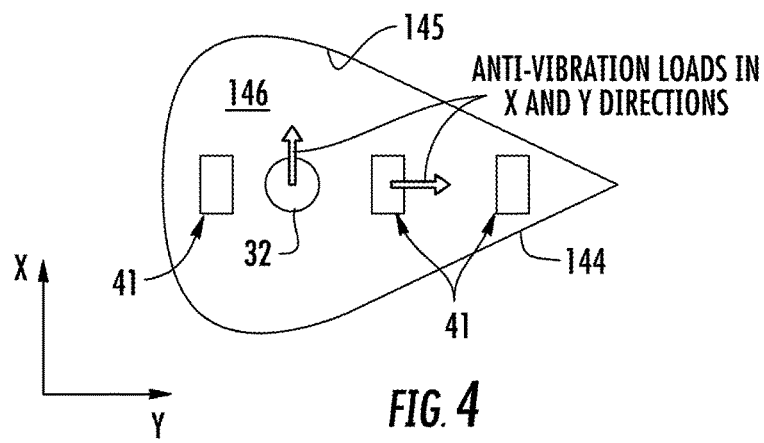
FIG. 4 is a top down view of an interior of a fairing of the aircraft of FIG. 1 in accordance with embodiments.

With reference to FIGS. 1 and 2, an aircraft 10 is provided. The aircraft 10 includes an airframe 11 formed to define a cabin in which a pilot and, in some cases, a crew and passengers are accommodated, and a flight computer 12 (see FIG. 3). The airframe 11 includes a top portion 13 at which a main rotor apparatus 14 is rotatably supported and a tail portion 15 at which a tail rotor apparatus 16 is rotatably supported. In accordance with embodiments and, as shown in FIG. 1, the aircraft 10 may be configured as a coaxial, counter-rotating helicopter with the main rotor apparatus 14 including an upper rotor 140, a lower rotor 141, a gearbox 142, support members 143 and a fairing 144. The upper rotor 140 is rotatable about a rotational axis in a first direction relative to the airframe 11 and the lower rotor 141 is coaxial with the upper rotor 140 and rotatable about the rotational axis in a second direction opposite the first direction. The fairing 144 is disposed between the upper rotor 140 and the lower rotor 141. The tail rotor apparatus 16 may include a propeller 160.

Although shown in FIGS. 1 and 2 as a coaxial, counter-rotating helicopter, it is to be understood that this is merely exemplary and that the aircraft 10 may have other configurations as well. By way of example, aspects can be used where the conventional single rotor system has a fairing suitable for such actuators.

As shown in FIG. 2, the aircraft 10 further includes a drive portion 20 including an engine 21 and a drive shaft 22. The engine 21 is configured to generate rotational energy, which is transmitted to the gearbox 142 by the drive shaft 22. The gearbox 142 then transmits the rotational energy to the upper rotor 140 and the lower rotor 141 to thereby drive rotation of the upper rotor 140 in the first direction and the lower rotor 141 in the second direction. The main rotor apparatus 14 and the drive portion 20 may both be disposed at or near the top portion 13 of the airframe 11 with at least the gearbox 142 being supportively disposed on the airframe 11 at or near the top portion 13 by the support members 143. The support members 143 serve to secure the main rotor apparatus 14 to the airframe 11 in opposition to the steady lifting loads generated by the rotations of the upper rotor 140 and the lower rotor 141. Engine support mounts 17 may be disposed to support the drive portion 20 at or near the top portion 13 of the airframe 11.

Each of the coaxial, counter rotating rotors 140 and 141 includes a set of blades 30 that extend outwardly from a blade retention hub 31. The blade retention hubs 31 are each coupled to the gearbox 142 via rotor shafts 32. As the upper rotor 140 and the lower rotor 141 rotate, the blades 30 generate steady (i.e., the steady lifting loads noted above) and vibratory loads that are transmitted through the blade retention hubs 31 and the fairing 144 to the rotor shafts 32 and into the gearbox 142. From the gearbox 142, the steady and vibratory loads are transmitted via the support members 143 into the fuselage of the airframe 11. Other vibratory loads can be transmitted from the gearbox 142 through the drive shaft 22 and into the engine 21. From the engine 21, these other vibratory loads can be transmitted to the fuselage of the airframe 11 through alternate pathways. The vibratory portion of the loads generated by the main rotor apparatus 14 may thus lead to vibration in the airframe 11 and the engine 21 causing fatigue to the pilot and any crew or passengers as well as possible damage to equipment mounted in the fuselage of the airframe 11.

With continued reference to FIG. 2 and with additional reference to FIGS. 3-6, the aircraft 10 further includes an actuation system 40. The actuation system 40 includes or is operably coupled to an active vibration control system 120 of the flight computer 12 and includes actuation elements 41 at the fairing 144 and at one or both of the gearbox 142 and at least one or more of the support members 143. The actuation elements 41 may be provided as single-point actuators that produce anti-vibration loads that act at single points on the corresponding or local structures and are not generated as a result of equal and opposite loads as would be created by a typical hydraulic ram type actuator. Thus, each actuation element 41 may be configured to generate a single-point load by an oscillation of a massive component at a desired amplitude, phase and frequency. The various single-point loads from each of the actuation elements 41 can then be combined as part of the active vibration control system 120 to generate a resulting anti-vibration moment to suppress the vibratory loads generated by the rotations of the upper rotor 140 and the lower rotor 141.

The fairing 144 is disposed axially between the upper rotor 140 and the lower rotor 141 along the longitudinal axis of the rotor shafts 32 to serve as a non-rotating aerodynamic element surrounding the rotor shafts 32. The fairing 144 may include a body 145 that is formed to define a generally hollow interior 146. The body 145 includes a blunt, curved forward side 147 and a tapered rear side 148 that correspond to the front and rear of the aircraft 10, respectively. While not required in all aspects, the fairing 144 does not rotate relative to the airframe 11.

The actuation elements 41 at the fairing 144 may be provided as single-point actuators and may be disposed within the interior 146 of the fairing 144 at positions off of the rotor shafts 32 (i.e., away from the rotor axis of the rotor shafts 32 such as on a standpipe and/or platform in the fairing 144) to increase the moment. More particularly, a first one of the actuation elements 41 may be disposed within the blunt, curved forward side 147, a second one of the actuation elements 41 may be disposed within the tapered rear side 148 and a third one of the actuation elements 41 may be disposed in a central portion of the interior 146. In any case, the actuation elements 41 at the fairing 144 may be transversely or perpendicularly oriented relative to one another. That is, in accordance with an exemplary embodiment, the first, second and third ones of the actuation elements 41 may be configured to generate anti-vibration loads in the X, Y and Z axes, respectively (see FIGS. 2 and 4), where the X, Y and Z axes may be orthogonal with respect to one another.

The actuation elements 41 at one or both of the gearbox 142 and at least one or more of the support members 143 may be configured similarly to or differently from the actuation elements 41 at the fairing 144.

In any case, the active vibration control system 120 identifies the presence and direction of the vibratory portion of the loads being applied to the gearbox 142 by the rotations of the upper rotor 140 and the lower rotor 141 and controls operations of the single-point actuators 41 at the fairing 144 and the one or both of the gearbox 142 and the at least one or more of the support members 143 accordingly. That is, the active vibration control system 120 controls the actuation elements 41 at the fairing 144 and at the gearbox 142/support elements 143 to generate anti-vibration loads, which are combinable to produce relatively large anti-vibration moments that can be adjusted in magnitude, phase and frequency to suppress vibration of the gearbox 142.

Figure 5:
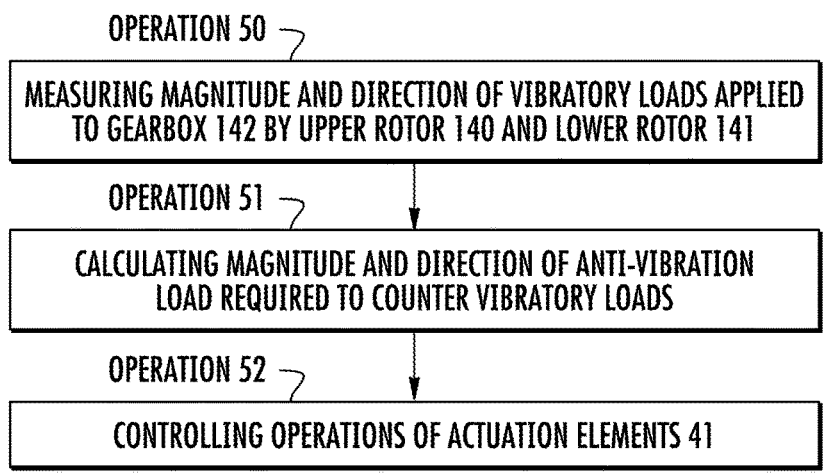
FIG. 5 is a flow diagram illustrating a method of controlling the actuation system of FIG. 3 in accordance with embodiments.

As shown in FIG. 5, during flight operations of the aircraft 10, the active vibration control system 120 senses or otherwise measures the magnitude and direction of the vibratory loads applied to the gearbox 142 due to the sum of the rotations of upper rotor 140 and the lower rotor 141 (operation 50). The active vibration control system 120 then calculates a magnitude and direction of the anti-vibration moment that is to be generated by the actuation elements 41 to counter the vibratory loads (operation 51) and controls operations of the actuation elements 41 accordingly (operation 52). The active vibration control system 120 may further determine whether vibration in the airframe 11 and the engine 21 are sufficiently reduced and may adjust the control of the actuation elements 41 if results of that determination indicate that excessive vibration remains. While not required in all aspects, the process can be performed using a computer and/or processor implemented by computer software and/or firmware encoded with processing instructions for the method.

Figure 6:
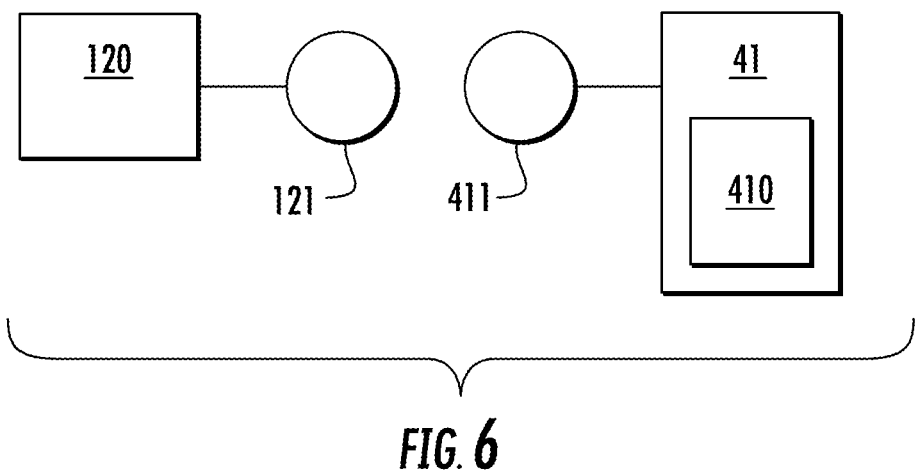
FIG. 6 is a schematic diagram illustrating wireless control of actuation elements of the actuation system of FIG. 3.

With reference to FIG. 6, the active vibration control system 120 may be wirelessly coupled to the actuation elements 41 at least at the fairing 144. In this case, the active vibration control system 120 includes a transmission element 121 and the actuation elements 41 may include a power source 410, such as a battery to power anti-vibration load generation movements, and a receiver element 411. Control instructions for operating the actuation elements 41 are thus issuable by the active vibration control system 120 via the transmission elements 121 and are receivable by the actuation elements 41 via the receiver elements 411.

Figure 7:
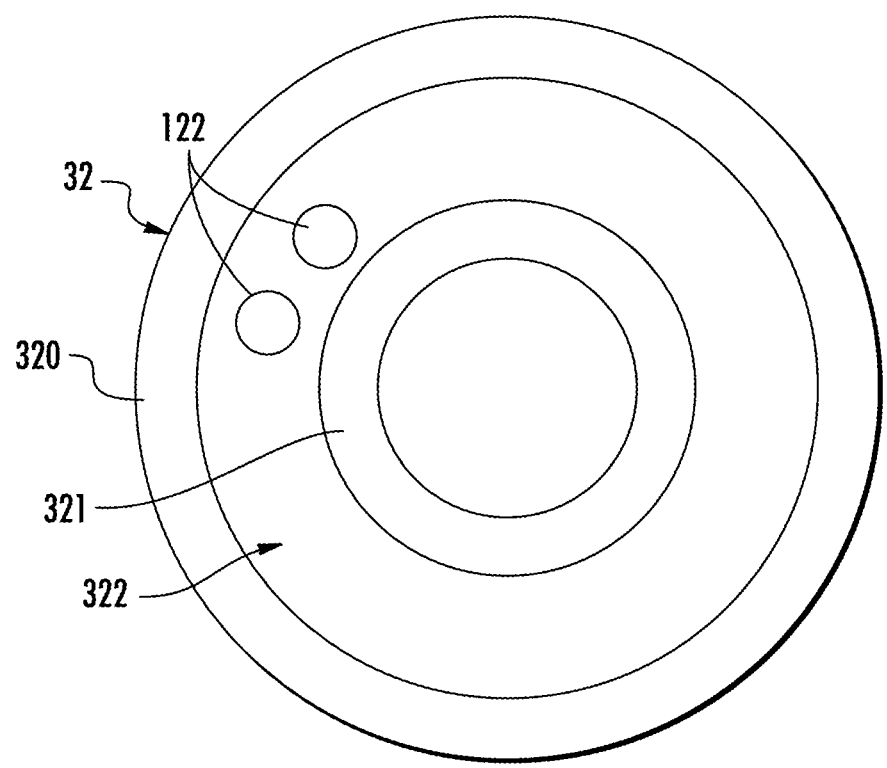
FIG. 7 is a schematic diagram illustrating wired control of actuation elements of the actuation system of FIG. 3.

With reference to FIG. 7, the active vibration control system 120 may be wired to the actuation elements 41 at least at the fairing 144. In this case, the active vibration control system 120 includes wiring 122 that extends from the airframe 11 to the fairing 144 and at least partially along rotor shafts 32. In accordance with embodiments, the rotor shafts 32 include a non-rotating element 320 disposed around a rotating element 321 to define an annulus 322. The wiring 122, which may include a power cord and a data cord, is disposed within the annulus 322. Further, while not shown, one of more of the actuation elements 41 can be mounted to the non-rotating element 320 within the fairing 144.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
an airframe;
an engine;
a drive portion driven by the engine;
a rotor apparatus, which includes a rotor rotatable relative to the airframe and a fairing;
a gearbox disposed to transmit rotational energy from the drive portion to the rotor to drive the rotor to rotate relative to the airframe and which generates a rotor rotation vibration;
support members by which the gearbox is disposed on the airframe; and
an actuation system including actuation elements mounted to the fairing, and at least one of the gearbox and each of the support members, the actuation system being configured to generate an anti-vibration moment using the actuation elements disposed at the fairing to counter the rotor rotation vibration.

2. The aircraft according to claim 1, wherein the actuation system comprises an active vibration control system configured to control operations of the actuation elements.

3. The aircraft according to claim 1, wherein the actuation elements are controlled via wiring.

4. The aircraft according to claim 1, wherein the actuation elements are wirelessly controlled, and the actuation elements disposed at the fairing further comprise a power source which powers the actuation elements disposed at the fairing.

5. The aircraft according to claim 1, wherein the anti-vibration moment is adjustable in magnitude, phase and frequency.

6. The aircraft according to claim 1, wherein the rotor comprises:
an upper rotor, which is rotatable relative to the airframe in a first direction; and
a lower rotor, which is rotatable relative to the airframe in a second direction opposite the first direction.

7. The aircraft according to claim 6, wherein the fairing is disposed between the upper and lower rotors and is hollow.

8. The aircraft according to claim 1, wherein the actuation elements comprise first, second and third single-point actuators disposed within the fairing.

9. The aircraft according to claim 8, wherein the first, second and third single-point actuators are transversely oriented with respect to one another to drive respective anti-vibration loads in substantially orthogonal directions.

10. An actuation system of an aircraft comprising coaxial, counter rotating rotors rotatable relative to an airframe, a fairing disposed between the rotors, a gearbox disposed to transmit rotational energy to the rotors to drive rotor rotation and support members by which the gearbox is disposed on the airframe, the actuation system comprising:

actuation elements mounted to the fairing, and at least one of the gearbox and each of the support members; and an active vibration control system configured to control the actuation elements at the fairing to generate an anti-vibration moment to counter rotor rotation vibration.

11. The actuation system according to claim 10, further comprising an actuator disposed on at least one or both of the gearbox and one or more of the support members, wherein the active vibration control system is further configured to control the actuation elements at the gearbox and the support members to generate an anti-vibration moment to counter rotor rotation vibration.

12. The actuation system according to claim 10, wherein the actuation elements are wirelessly controlled.

13. The actuation system according to claim 10, wherein the actuation elements disposed at the fairing comprise first, second and third single-point actuators within the fairing.

14. The actuation system according to claim 13, wherein the first, second and third single-point actuators are transversely oriented with respect to one another.

\* \* \* \* \*